(12) United States Patent
Garcia

(10) Patent No.: US 6,220,622 B1
(45) Date of Patent: Apr. 24, 2001

(54) WHEELBARROW REAR WHEEL SYSTEM

(76) Inventor: Guadalupe Garcia, 2457 W. Hatch Rd., Modesto, CA (US) 95351

( * ) Notice: Subject to any disclaimer, the term of this patent is extended or adjusted under 35 U.S.C. 154(b) by 0 days.

(21) Appl. No.: 09/276,100

(22) Filed: Mar. 25, 1999

(51) Int. Cl.$^7$ ............................................. B62B 1/20
(52) U.S. Cl. ...................... 280/653; 280/47.34; 269/17; 298/2
(58) Field of Search .................. 280/651, 652, 280/653, 654, 659, 43, 43.1, 47.34, 47.3, 47.33, 33.994, 87.051; 298/2, 3; 254/102, 2 B, DIG. 1; 269/17

(56) References Cited

U.S. PATENT DOCUMENTS

| | | | |
|---|---|---|---|
| D. 362,529 | * | 9/1995 | Hilaire, Jr. et al. ............ 280/33.994 |
| 408,994 | * | 8/1889 | Stambaugh et al. ................ 280/43.1 |
| 717,471 | * | 12/1902 | Tanner .................................. 280/43 |
| 2,598,261 | * | 5/1952 | Hrabal ............................... 280/47.33 |
| 2,718,405 | * | 9/1955 | Casey ................................. 280/43.1 |
| 3,581,671 | * | 6/1971 | Hart ...................................... 269/17 |
| 3,722,904 | * | 3/1973 | Puckett ................................ 280/653 |
| 3,741,586 | * | 6/1973 | Wiczer ................................ 280/652 |
| 3,963,258 | * | 6/1976 | Stone et al. ....................... 280/47.34 |
| 4,052,087 | * | 10/1977 | Gagliardi .............................. 280/43 |
| 4,720,048 | * | 1/1988 | Maroney et al. ................. 280/47.34 |
| 4,767,128 | * | 8/1988 | Terhune ............................. 280/47.2 |
| 5,325,938 | * | 7/1994 | King ................................ 280/33.994 |
| 5,531,295 | * | 7/1996 | Kopman et al. .................. 280/47.34 |
| 5,692,761 | * | 12/1997 | Havlovitz ............................ 280/659 |
| 5,772,236 | * | 6/1998 | Clark ..................................... 280/43 |
| 5,878,827 | * | 3/1999 | Fox ..................................... 280/653 |
| 5,924,708 | * | 7/1999 | Bisaillon et al. ................... 280/653 |
| 6,053,515 | * | 4/2000 | Kelley ................................. 280/653 |

* cited by examiner

Primary Examiner—J. J. Swann
Assistant Examiner—Christopher Bottorff

(57) ABSTRACT

A new Wheelbarrow Rear Wheel System for improving the ease of use of a wheelbarrow. The inventive device includes a frame assembly secured to the underside of the tray of a wheelbarrow adjacent the rear end of the tray and a wheel assembly coupled to the frame assembly. The wheel assembly includes a pair of spaced wheels and is adjustable relative to the frame assembly so as to enable a user thereof to raise and lower the rearward portion of the wheelbarrow.

14 Claims, 2 Drawing Sheets

WHEELBARROW REAR WHEEL SYSTEM

BACKGROUND OF THE INVENTION

1. Field of the Invention

The present invention relates to wheelbarrows and more particularly pertains to a new Wheelbarrow Rear Wheel System for improving the ease of use of a wheelbarrow.

2. Description of the Prior Art

The use of wheelbarrows is known in the prior art. More specifically, wheelbarrows heretofore devised and utilized are known to consist basically of familiar, expected and obvious structural configurations, notwithstanding the myriad of designs encompassed by the crowded prior art which have been developed for the fulfillment of countless objectives and requirements.

Known prior art wheelbarrows include U.S. Pat. No. 4,962,833; U.S. Pat. No. 4,854,601; U.S. Pat. No. 5,149,116; U.S. Pat. No. 4,479,658; U.S. Pat. No. D349,797; and U.S. Pat. No. 4,261,590.

While these devices fulfill their respective, particular objectives and requirements, the aforementioned patents do not disclose a new Wheelbarrow Rear Wheel System. The inventive device includes a frame assembly secured to the underside of a wheelbarrow and a wheel assembly coupled to the frame assembly. The wheel assembly includes a pair of spaced wheels and is adjustable so as to enable a user thereof to raise and lower the rearward portion of the wheelbarrow.

In these respects, the Wheelbarrow Rear Wheel System according to the present invention substantially departs from the conventional concepts and designs of the prior art, and in so doing provides an apparatus primarily developed for the purpose of improving the ease of use of a wheelbarrow.

SUMMARY OF THE INVENTION

In view of the foregoing disadvantages inherent in the known types of wheelbarrows now present in the prior art, the present invention provides a new Wheelbarrow Rear Wheel System construction wherein the same can be utilized for improving the ease of use of a wheelbarrow.

The general purpose of the present invention, which will be described subsequently in greater detail, is to provide a new Wheelbarrow Rear Wheel System apparatus and method which has many of the advantages of the wheelbarrows mentioned heretofore and many novel features that result in a new Wheelbarrow Rear Wheel System which is not anticipated, rendered obvious, suggested, or even implied by any of the prior art wheelbarrows, either alone or in any combination thereof.

To attain this, the present invention generally comprises a frame assembly secured to the underside of a wheelbarrow and a wheel assembly coupled to the frame assembly. The wheel assembly includes a pair of spaced wheels and is adjustable so as to enable a user thereof to raise and lower the rearward portion of the wheelbarrow.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Wheelbarrow Rear Wheel System apparatus and method which has many of the advantages of the wheelbarrows mentioned heretofore and many novel features that result in a new Wheelbarrow Rear Wheel System which is not anticipated, rendered obvious, suggested, or even implied by any of the prior art wheelbarrows, either alone or in any combination thereof.

It is another object of the present invention to provide a new Wheelbarrow Rear Wheel System which may be easily and efficiently manufactured and marketed.

It is a further object of the present invention to provide a new Wheelbarrow Rear Wheel System which is of a durable and reliable construction.

An even further object of the present invention is to provide a new Wheelbarrow Rear Wheel System which is susceptible of a low cost of manufacture with regard to both materials and labor, and which accordingly is then susceptible of low prices of sale to the consuming public, thereby making such Wheelbarrow Rear Wheel System economically available to the buying public.

Still yet another object of the present invention is to provide a new Wheelbarrow Rear Wheel System which provides in the apparatuses and methods of the prior art some of the advantages thereof, while simultaneously overcoming some of the disadvantages normally associated therewith.

Still another object of the present invention is to provide a new Wheelbarrow Rear Wheel System for improving the ease of use of a wheelbarrow.

Yet another object of the present invention is to provide a new Wheelbarrow Rear Wheel System which includes a frame assembly secured to the underside of a wheelbarrow and a wheel assembly coupled to the frame assembly. The wheel assembly includes a pair of spaced wheels and is adjustable so as to enable a user thereof to raise and lower the rearward portion of the wheelbarrow.

Still yet another object of the present invention is to provide a new Wheelbarrow Rear Wheel System that would effectively transform a conventional one-wheeled wheelbarrow into a three-wheeled wheelbarrow. As such, the three-wheeled wheelbarrow would be more maneuverable wherein a user thereof would not have to lift the wheelbarrow while pushing it. Accordingly, the present invention would reduce the effort necessary for moving the three-wheeled wheelbarrow. Thus, reducing the risk of back injuries which can result from lifting and moving a conventional one-wheeled wheelbarrow.

Even still another object of the present invention is to provide a new Wheelbarrow Rear Wheel System that can be easily installed on a conventional wheelbarrow.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
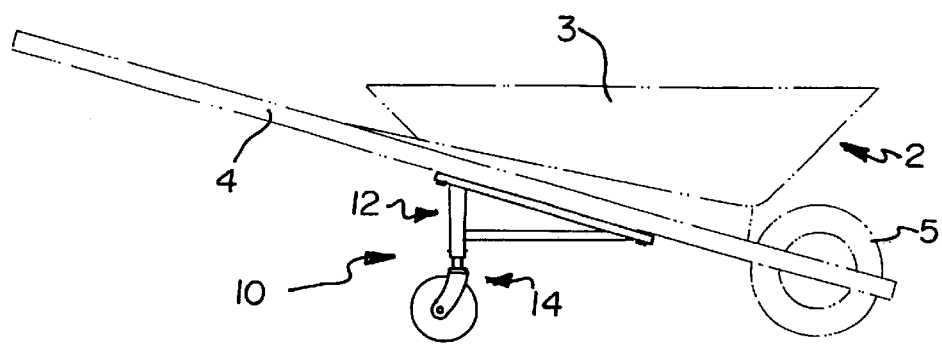
FIG. 1 is an illustration of a new Wheelbarrow Rear Wheel System according to the present invention.

With reference now to the drawings, and in particular to FIGS. 1 through 4 thereof, a new Wheelbarrow Rear Wheel System embodying the principles and concepts of the present invention and generally designated by the reference numeral 10 will be described.

More specifically, it will be noted that the Wheelbarrow Rear Wheel System 10 comprises a frame assembly 12 secured to the underside of a wheelbarrow 2 and a wheel assembly 14 coupled to the frame assembly 12. The wheel assembly 14 includes a pair of spaced wheels 45 and is adjustable so as to enable a user thereof to raise and lower the rearward portion of the wheelbarrow 2.

The Wheelbarrow Rear Wheel System 10 is intended for use with a wheelbarrow 2 including a tray 3, a pair of spaced handles 4 connected to the tray 3 and extending from the rear end thereof, and a front wheel 5 rotatably mounted to the tray 3 adjacent the front end thereof. The present invention may be used to replace the leg supports of a conventional wheelbarrow.

As such, the leg supports of the conventional wheelbarrow are removed and the Wheelbarrow Rear Wheel System 10 is installed in their place.

Figure 2:
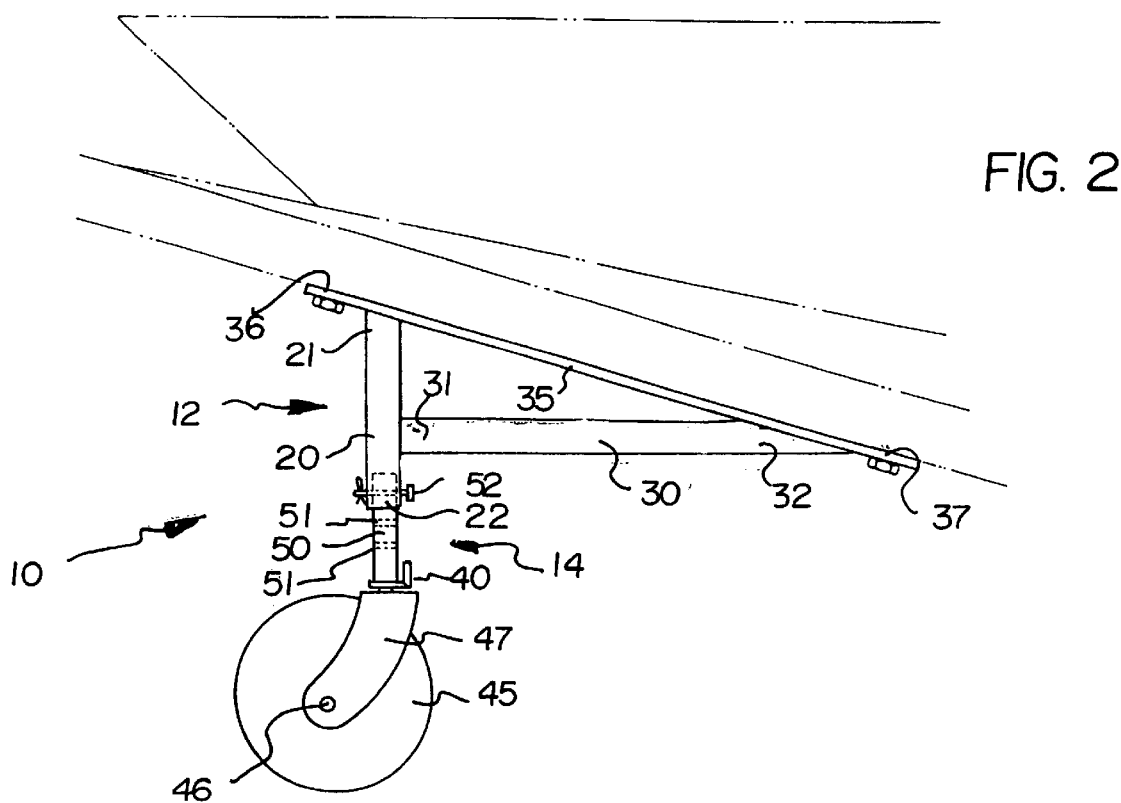
FIG. 2 is a side view thereof.
Figure 3:
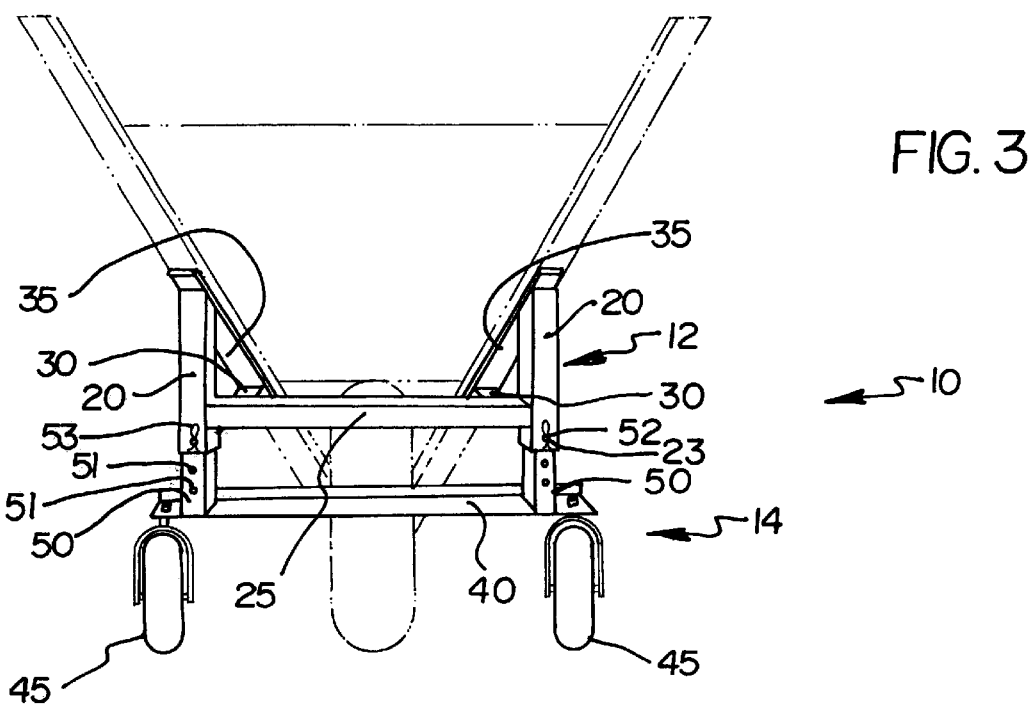
FIG. 3 is a rear view of the present invention.

As best illustrated in FIGS. 1 through 3, it can be shown that the frame assembly 12 comprises a pair of spaced legs 20 each having an upper end 21 and a lower end 22, a crossbar 25 interconnecting the pair of spaced legs 20 adjacent the lower ends 22 thereof, and a pair of braces 30 each attached at one end to the crossbar 25. Each leg 20 is substantially vertically oriented and each brace 30 is substantially horizontally oriented. Each brace 30 has a first end 31 and a second end 32 wherein each brace 30 is attached at the first end 31 thereof to the crossbar 25.

In addition, a pair of mounting plates 35 are provided. Each mounting plate 35 interconnects one of the pair of spaced legs 20 and one of the pair of braces 30. Each mounting plate 35 is attached at a first end 36 to the upper end 21 of the leg 20 and is attached at a second end 37 to the second end 32 of the brace 30. Each mounting plate 35 has a hole 38 therein adjacent each end thereof. The hole 38 is adapted for receiving a fastener used in securing each mounting plate 30, and thus the frame assembly 12, to the tray 3 of the wheelbarrow 2.

The wheel assembly 14 comprises a cross member 40, a pair of spaced wheels 45 attached to opposite ends of the cross member 40 and extending downward therefrom, and a pair of spaced posts 50 extending upward from opposite ends of the cross member 40. The lower end 22 of each of the pair of spaced legs 20 of the frame assembly 12 is open and each leg 20 has a leg hole 23 therein. Furthermore, each of the pair of spaced posts 50 have a plurality of aligned post holes 51 therein. As such, the wheel assembly 14 is adjustably coupled to the frame assembly 12 wherein one of the posts 50 slidably fits within one of the legs 20. A pin 52 is selectively insertable through the leg hole 23 of the leg 20 and through one of the plurality of aligned post holes 51 of the post 50. A cotter pin 53 is provided for retaining the pin 52 in position.

Preferably, each of the wheels 45 are swivelly attached to the cross member 40. Accordingly, each of the wheels 45 are allowed to rotate through 360 degrees. Furthermore, each of the wheels 45 are trailing wheels wherein the axle 46 of each of the wheels 45 is offset from their point of attachment to the cross member 40 by angled wheel forks 47. The angled wheel forks 47 are spaced substantially close to each of the wheels 45 so as to function as mud scrapers for removing mud when it becomes built-up on the wheels 45.

Figure 4:
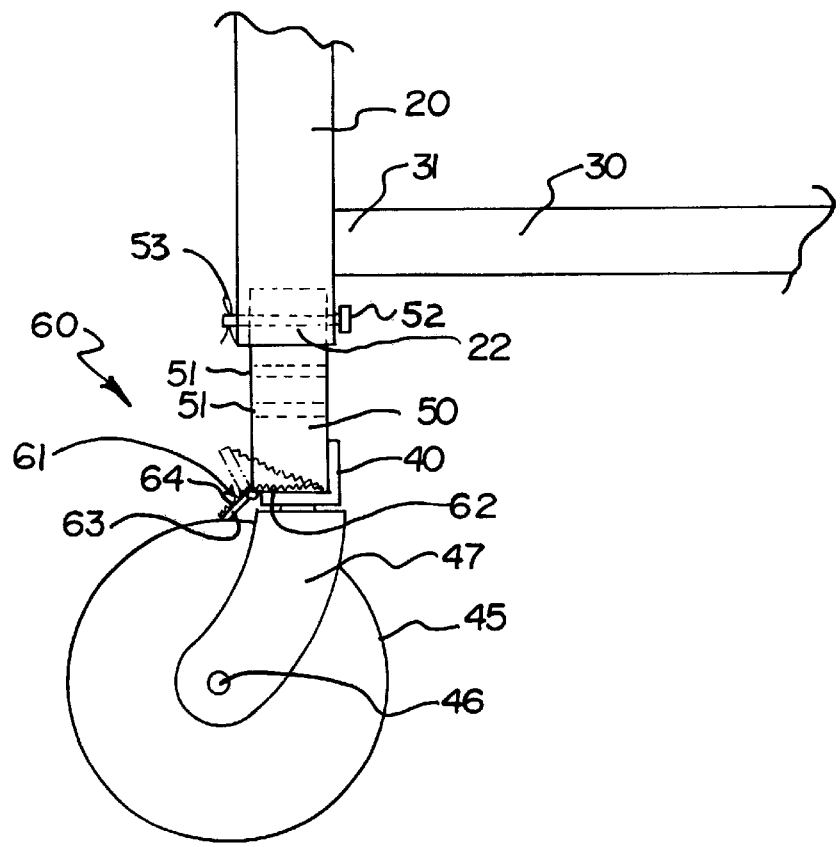
FIG. 4 is an illustration of the braking means of the present invention.

As best illustrated in FIG. 4, it can be shown that a braking means 60 is provided for hindering rotation of at least one of the wheels 45 of the wheel assembly 14. The braking means 60 comprises a hinged plate 61 including a fixed piece 62 secured to the cross member 40 above one of the wheels 45 and a hinged piece 63 hingedly connected to the fixed piece 62. The hinged piece 63 is pivotable between an upward position wherein the wheel 45 is free from obstruction and allowed to rotate freely and a downward position wherein the hinged piece 63 frictionally contacts the wheel 45 such that the wheel 45 is hindered from rotating freely. The hinged piece 63 is biased to the upward position by a spring 64.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A rear wheel system for use with a wheelbarrow including a tray having a front end, a rear end, and an underside, a pair of spaced handles connected to said tray and extending from said rear end thereof, and a front wheel rotatably mounted to said tray adjacent said front end thereof, said rear wheel system comprising:

a frame assembly adapted to be secured to said underside of said tray of said wheelbarrow adjacent said rear end of said tray;

a wheel assembly to said frame assembly, said wheel assembly including a pair of spaced wheels;

a pair of spaced legs each having an upper end and a lower end;

a crossbar interconnecting said pair of spaced legs adjacent said lower ends thereof;

a pair of braces each having a first end and a second end, each brace attached at said first end thereof to said crossbar;

a pair of mounting plates each having a first end and a second end, each mounting plate attached at said first end thereof to one of said pair of spaced legs adjacent said upper end of said leg and attached at said second end thereof to one of said pair of braces adjacent said second end of said brace;

each mounting plate adapted to be secured to said tray of said wheelbarrow;

a cross member;

a pair of spaced wheels attached to opposite ends of said cross member and extending downward therefrom;

a pair of spaced posts extending upward from opposite ends of said cross member; and said pair of spaced posts of said wheel assembly coupled to said pair of spaced legs of said frame assembly.

2. The rear wheel system of claim 1, wherein said wheel assembly is adjustably coupled to said frame assembly so as to enable a user thereof to raise and lower the rearward portion of said wheelbarrow.

3. The rear wheel system of claim 2, wherein said lower end of each of said pair of spaced legs of said frame assembly is open, each leg having a leg hole therethrough adjacent said lower end thereof, wherein one of said pair of spaced posts is slidably fitted within said lower end of one of said pair of spaced legs, each post having a plurality of aligned post holes therethrough, and further comprising:

a pin selectively insertable through said leg hole of each leg and through one of said plurality of aligned post holes of each post.

4. The rear wheel system of claim 1, further comprising:

a braking means for hindering rotation of at least one of said pair of spaced wheels of said wheel assembly.

5. The rear wheel system of claim 4, wherein said braking means comprises:

a hinged plate including a fixed piece secured to said cross member above one of said pair of spaced wheels and a hinged piece hingedly connected to said fixed piece, said hinged piece pivotable between an upward position wherein said wheel is free from obstruction and allowed to rotate freely and a downward position wherein said hinged piece frictionally contacts said wheel such that said wheel is hindered from rotating freely.

6. The rear wheel system of claim 5, further comprising:

a spring attached at a first end to said hinged piece and attached at a second end to said fixed piece, said spring biasing said hinged piece to said upward position.

7. The rear wheel system of claim 1, wherein said frame assembly comprises:

a pair of spaced subframes each including a leg having an upper end and a lower end, and a brace having a first end and a second end, said brace attached at said first end thereof to a crossbar adjacent to said leg, each leg secured at said upper end thereof to said underside of said tray of said wheelbarrow whereby each leg extends downward from said tray of said wheelbarrow, each brace adapted to be secured at said second end thereof to said underside of said tray of said wheelbarrow.

8. The rear wheel system of claim 7, further comprising:

said crossbar interconnecting said pair of spaced subframes, said crossbar attached at opposite ends thereof to said leg of each of said pair of subframes adjacent said lower end of said leg.

9. The rear wheel system of claim 7, further comprising:

a mounting plate interconnecting said leg and said brace of each of said pair of subframes, said mounting plate having a first end and a second end, said mounting plate attached at said first end thereof to said upper end of said leg and attached at said second end thereof to said second end of said brace, said mounting plate adapted to be secured to said tray of said wheelbarrow.

10. The rear wheel system of claim 7, wherein said wheel assembly comprises:

a pair of wheels, and a pair of posts, one of said pair of posts extending upward from one of said pair of wheels, one of said pair of posts coupled to said leg of one of said pair of spaced subframes.

11. The rear wheel system of claim 10, wherein said lower end of said leg of each of said pair of subframes is open, wherein one of said pair of posts is slidably fitted within said lower end of said leg of one of said pair of spaced subframes, and further comprising:

a retention means for retaining said post within said leg.

12. The rear wheel system of claim 11, wherein said leg of each of said pair of spaced subframes has a leg hole therethrough adjacent said lower end thereof, wherein each of said pair of posts have a plurality of aligned post holes therethrough, and wherein said retention means comprises:

a pin selectively insertable through said leg hole of said leg and through one of said plurality of aligned post holes of one of said pair of posts.

13. The rear wheel system of claim 10, further comprising:

a braking means for hindering rotation of at least one of said pair of wheels of said wheel assembly.

14. A rear wheel system for use with a wheelbarrow including a tray having a front end, a rear end, and an underside, a pair of spaced handles connected to said tray and extending from said rear end thereon and a front wheel rotatably mounted to said tray adjacent said front end thereof, said rear wheel system comprising:

- a frame assembly adapted to be secured to said underside of said tray of said wheelbarrow adjacent said rear end of said tray;
- a wheel assembly coupled to said frame assembly, said wheel assembly including a pair of spaced wheels;
- a pair of spaced legs;
- a crossbar interconnecting said pair of spaced legs;
- a pair of braces each having a first end and a second end, each brace attached at said first end thereof to said crossbar;
- a pair of mounting plates for mounting to said tray of said wheelbarrow, each mounting plate having a first end and a second end, each mounting plate being attached at said first end thereof to one of said pair of spaced legs and being attached at said second end thereof to one of said pair of braces;
- a cross member;
- a pair of spaced wheels attached to said cross member and extending downward therefrom;
- a pair of spaced posts extending upward from said cross member; and
- said pair of spaced posts of said wheel assembly being coupled to said pair of spaced legs of said frame assembly.

* * * * *